3,360,500
PROCESS FOR PREPARING HIGH MOLECULAR WEIGHT POLYESTERS
William L. Hergenrother, Akron, Ohio, assignor to The Firestone Tire & Rubber Company, Akron, Ohio, a corporation of Ohio
No Drawing. Filed May 21, 1964, Ser. No. 369,316
5 Claims. (Cl. 260—75)

This invention relates to the production of high molecular weight polyesters, and more particularly the production of such polyesters from aromatic dicarboxylic acids and glycols, e.g. polyesters such as polyethylene terephthalate.

The production of high molecular polyesters proceeds in general through two stages which more-or-less shade into each other, (1) a precondensation stage in which mono- and di-esters of the glycols with dicraboxylic acids are formed, in many cases along with varying amounts of low molecular weight polymers, and (2) a polycondensation stage, wherein the precondensate formed in stage (1) is further condensed to form high molecular weight polymeric chains. Various catalytic agents of greater or less efficiency have been proposed for these reactions. The requirements for such catalysts are rather exacting; they must be inexpensive, of low toxicity, and readily handled in the polymerization process, and must not adversely affect the appearance, physical properties, or stability of the ultimate polymeric products.

Accordingly, it is an object of this invention to provide a novel catalytic agent and process for the preparation of high molecular weight polyesters.

Another object is to provide such a catalyst and process having especial application in the polycondensation stage in the preparation of high molecular weight polyesters.

A further object is to provide such a catalyst and process having especial application in the preparation of polyethylene terephthalate.

A still further object is to provide such a catalyst which will be inexpensive; of low toxicity both in the manufacture of the polyester and also in use in the final product; easily handled in the process; and which will not adversely affect the appearance, physical properties, or resistance of the final product to degradation by heat or aging.

*Synopsis of the invention*

The above and other objects are secured, in accordance with this invention in a process in which the production of high molecular weight polyesters, particularly the polycondensation stage thereof, is carried out by heating the materials to be condensed to the polyesters in the presence of catalytic amounts of antimony trisulfide. The introduction of the catalyst is preferably, although not necessarily, made after there has been produced a precondensate, i.e., a low molecular weight mixture of mono- and/or di-esters of the acids with the glycols, and/or low molecular weight polyesters. The process is a particular application in the preparation of polyesters based on aromatic dicarboxylic acids and glycols, such as polyethylene terephthalate.

*The precursor materials used in this invention*

As noted above, the preparation of high molecular polyesters proceeds by way of two more or less overlapping stages, (1) the initial formation of low molecular weight esterification products, followed by (2) the polycondensation stage. The antimony trisulfide ($Sb_2S_3$) catalyst of this invention is of particular use in stage (2), but may be present in stage (1) provided that there is no unfavorable interaction with particular catalysts, materials or conditions employed in the first stage. It will usually be preferred to withhold the antimony trisulfide until after the initial stage (1). The first stage may be carried out by any conventional process, for instance by ester interchange between a lower alkyl ester of the dicarboxylic acid and the appropriate glycol. Alternatively the precondensate may be formed by direct esterification between the dicarboxylic acid and the glycol. These precondensation reactions are carried out under conventional conditions of heat, vacuum, and catalysis, and result in a low molecular weight product containing greater or lesser proportions of the mono- and di-esters of the acid with the glycol, and of low molecular weight polyester chains. Dicarboxylic acids (or their lower alkyl esters when the esterinterchange method is used) which may enter into the preparation of the precondensates include the (preferred) symmetrical aromatic dicarboxylic acids such as terephthalic acid, p,p'-diphenyl ether dicarboxylic acid, p,p'-diphenyl sulfone dicarboxylic acid, p,p'-diphenyl dicarboxylic acid, and the like. However other types of acids may also be used, such as the unsymmetrical isophthalic acid and aliphatic dicarboxylic acids on the order of adipic acid, sebacic acid, azelaic acid, suberic acid and the like. Suitable glycols include for instance the (preferred) polymethylene glycols containing up to 12 carbon atoms such as ethylene glycol, 1,3-dihydroxy propane, 1,6-dihydroxy hexane, 1,8-dihydroxy octane, 1,12-dihydroxy dodecane and the like. However there may also be employed branched chain glycols such as 1-methyl-1,2-dihydroxy propane, 2,2-dimethyl 1,3-dihydroxy propane, and the like.

*The polycondensation*

The polycondensation of this invention comprises heating the prepolymer (formed from any of the materials by any of the methods described above) in the presence of catalytic amounts of antimony trisulfide ($Sb_2S_3$) while removing the excess glycol evolved by the polycondensation. As to the amount of antimony trisulfide, any finite amount will accelerate the polycondensation to some degree. Ordinarily there will be employed at least about 0.005%, and preferably at least about 0.1%, of the antimony trisulfide, based on the weight of the prepolymer. There is no critical technological upper limit, but increments greater than 1.0% will not greatly further increase the rate of reaction, and will generally be found uneconomic. The reaction mass is maintained in molten state and heated in the range 200° to 285° C., and preferably 275° to 285° C., and when evolution of glycol vapors at atmospheric pressure ceases, the pressure should be lowered progressively, ultimate absolute pressures on the order of 1.0 or less mm. of mercury being desirable. When the polycondensation has been carried out to the desired degree e.g. such that the intrinsic viscosity has been raised to above .25 and preferably above .9, the polycondensation reaction conditions are discontinued, and the molten high polymeric ester removed and either directly spun, extruded, cast etc. into the desired final form, or else cooled to solidify the polymer for storage and/or shipment. The reaction proceeds quite rapidly, usually being completed to the desired degree within 2–5 hours, and the product will be found to have good color and to be stable against degradation by heat, light, atmosphere or other deteriorating influences.

With the foregoing general discussion in mind, there are given herewith detailed experimental examples of the practice of the invention. All parts given are by weight, unless otherwise explicitly indicated.

*Example I*

Dimethyl terephthalate _____ grams__ 97
Ethylene glycol _____ grams__ 62
Zinc acetate dihydrate _____milligrams__ 12
Antomony trisulfide ($Sb_2S_3$) _____milligrams__ 40

For this preparation there was provided a 200 ml. flask provided with a molten metal heating bath, a sparger for introducing nitrogen, a stirrer and an offtake provided with a condenser. The dimethyl terephthalate, ethylene glycol and zinc acetate were charged first, and the temperature brought up to 200° C. and held at this level until methanol ceased to be evolved. The temperature was then raised to 260° C., whereby a portion of the excess ethylene glycol was distilled off. At this point the antimony trisulfide was added, the temperature raised to 280° C. and the pressure inside the equipment reduced to 0.15 mm. of mercury, which conditions were continued to 3 hours. At this point the molten polymer was a green-gray color. The mass was then cooled, and the resultant prduct was a light-gray, hard polyethylene terephthalate having an intrinsic viscosity of 0.64; a relative viscosity, determined at a concentration of 0.5% in 1:1 phenol-tetrachloroethane at 25° C., of 1.35; and a plasticity of 6200 mm.$^2$ (measured as square millimeters of the area of a plaque pressed out between aluminum foil sheets at a temperature of 250° C. and a total ram load of 2,000 lbs.).

*Example II*

(A) Prepolymer preparation:
Terephthalic acid _____grams__ 332
Ethylene glycol (200 grams)_____cc__ 180
Water _____ml__ 180
Calcium acetate monohydrate _____grams__ 1.84

A one-liter stainless steel high pressure autoclave provided with a stirrer operating at 900 r.p.m. was provided for this experiment. A series of runs was made in order to provide batches of prepolymer for use in the final polycondensation runs described at "(B) Polycondensation" below. In each preparation, the materials of the recipe were charged into the autoclave, which was then purged with nitrogen, sealed and heated to 240° C. At this temperature the pressure was initially 190 p.s.i.g., but during the succeeding one-half hour this pressure gradually rose to 340 p.s.i.g. These conditions were maintained for an additional hour, at which time the water vapor was gradually bled off until the pressure dropped to 50 p.s.i.g. Thereafter the resultant prepolymer was removed in molten form through a discharge part in the bottom of the autoclave, the molten prepolymer solidifying to a white cake at about 180° C. The above run is typical of all the runs used to prepare prepolymers for use in the final polycondensation experiments which will now be described.

(B) Polycondensation:
Low molecular weight polyethylene terephthalate prepolymer (from a batch prepared substantially as described above)__grams__ 100
Antimony trisulfide, milligrams (per Table I)__ 8–66

A series of runs in accordance with the foregoing recipe was made to convert low molecular weight polyethylene terephthalate prepolymers to high molecular weight resinous polyethylene terephthalate, varying the amount of antimony trisulfide used from run to run as set out hereinafter in Table I. The runs were conducted in a 200 ml. round bottom flask provided with a heating jacket and with connections for purging with nitrogen and applying vacuum. The flask was surmounted with an offtake, and a condenser for removing volatilized glycol. These conditions were continued for a duration of time indicated for the individual runs in Table I, at the end of which time the vacuum was broken and the molten polymer poured out to solidify. The plasticity, in square millimeters, and the relative viscosity, both measured as described in Example I were determined for each product and the results are set forth herewith in Table I. Likewise set forth in Table I is the intrinsic viscosity of each product.

TABLE I

| Run No. | Antimony Sulfide Used (mg.) | Duration of Heating (hr.) | Plasticity (mm.$^2$) | Intrinsic Viscosity | Relative Viscosity |
|---|---|---|---|---|---|
| 1 | 40 | 3 | 3,550 | 0.92 | 1.54 |
| 2 | 40 | 5 | 3,180 | 1.20 | 1.73 |
| 3 | 40 | 2 | 4,370 | 0.84 | 1.48 |
| 4 | 40 | 3 | 3,700 | 0.91 | 1.53 |
| 5 | 8 | 3 | 6,900 | 0.62 | 1.34 |
| 6 | 40 | 3 | 8,200 | 0.57 | 1.31 |
| 7 | 40 | 3 | 5,100 | 0.73 | 1.41 |
| 8 | 24 | 3 | 4,550 | 0.83 | 1.47 |
| 9 | 40 | 3 | 4,300 | 0.88 | 1.51 |
| 10 | 66 | 3 | 3,300 | 1.19 | 1.72 |
| 11 | 40 | 2 | 4,380 | 0.83 | 1.47 |

*Example III.—Large scale preparation*

Low molecular weight polyethylene terephthalate prepolymer _____lbs__ 32.56
Antimony trisulfide _____grams__ 5.91

For this run there was used a 10-gallon stainless steel autoclave provided with a 60 r.p.m. anchor-type agitator and with a heating jacket and connections for purging with nitrogen and applying vacuum. The ingredients of the recipe were charged to the kettle. The kettle was flushed well with nitrogen both before and after charging the prepolymer. The kettle was then sealed, heated and agitated per the following schedule of Table II.

TABLE II.—TIME SCHEDULE

| Time (hrs.) | Batch Temperature (° F.) | Kettle Vacuum (mm. Hg) |
|---|---|---|
| 0.0 | 70 | |
| 2.6 | 355 | |
| 3.0 | 385 | |
| 4.0 | 485 | |
| 4.4 | | ($^1$) |
| 4.5 | 510 | 105 |
| 4.7 | 505 | 45 |
| 5.0 | 510 | 25 |
| 5.2 | 510 | 9 |
| 5.5 | 525 | 4 |
| 6.0 | 530 | 2.9 |
| 6.5 | 530 | 2.8 |
| 7.5 | 534 | 2.0 |
| 8.2 | 538 | 1.9 |
| 8.5 | | 1.8 |
| 8.7 | 530 | .63 |
| 9.7 | 542 | .7 |
| 10.1 | 550 | .7 |
| 10.5 | | ($^2$) |

$^1$ Started.
$^2$ Pressure applied.

At the end of the time indicated in the table, nitrogen pressure was applied above the batch in the kettle and the molten polymer extruded out of the bottom of the vessel through a die having three ¼" holes into a water bath to chill and solidify the polymer. The discharge required about 3 hours. The product was a high grade polyethylene terephthalate resin suitable for spinning into filament, cordage, etc., for extrusion as films, and for molding into fabricated shapes.

What is claimed is:
1. Process of preparing high molecular weight linear polyesters of dicarboxylic acids with glycols from low molecular weight precursors thereof, said precursors being selected from the group consisting of
   (1) mono-esters of said dicarboxylic acids with said glycols
   (2) di-esters of said dicarboxylic acids with said glycols, and
   (3) mixtures of said mono- and di-esters with each other and with low molecular weight polyesters of said dicarboxylic acids with said glycols,
which process comprises
heating and precursors in admixture with antimony tri- sulfide as a catalyst until the intrinsic viscosity of the resultant condensation product is above .25.

2. Process according to claim 1, wherein the dicarboxylic acid is terephthalic acid, and the glycol is ethylene glycol.

3. Process according to claim 2, wherein the antimony trisulfide is present in an amount from .005 to 0.10% based on the weight of said precursors.

4. Process according to claim 2, wherein the heating is conducted at from 200° C. to 285° C.

5. Process according to claim 2, in which the heating is carried out under an absolute pressure not greater than 1 mm. of mercury.

References Cited

UNITED STATES PATENTS

| | | | |
|---|---|---|---|
| 2,739,957 | 3/1956 | Billica et al. | 260—75 |
| 2,881,145 | 4/1959 | Schmutzler | 260—22 |
| 2,998,412 | 8/1961 | Fletcher et al. | 260—75 |

FOREIGN PATENTS 740,381   11/1955   Great Britain.

WILLIAM H. SHORT, *Primary Examiner.*

LOUISE P. QUAST, *Examiner.*